United States Patent
Levine et al.

(10) Patent No.: US 6,714,963 B1
(45) Date of Patent: Mar. 30, 2004

(54) SYSTEM AND METHOD FOR IMPROVING WEB SITE ACCESSIBILITY

(75) Inventors: James L. Levine, Yorktown Heights, NY (US); Peter G. Fairweather, Yorktown Heights, NY (US); Jim Spohrer, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 09/676,427

(22) Filed: Sep. 29, 2000

(51) Int. Cl.[7] .............................................. G06F 13/00
(52) U.S. Cl. ...................................................... 709/203
(58) Field of Search ................................ 709/200, 203; 382/100, 114; 715/517, 523; 704/270, 271, 275

(56) References Cited

U.S. PATENT DOCUMENTS

| | | | |
|---|---|---|---|
| 5,809,247 A | 9/1998 | Richardson et al. | 709/218 |
| 5,918,217 A | 6/1999 | Maggioncalda et al. | 705/36 |
| 5,956,483 A | 9/1999 | Grate et al. | 709/203 |
| 6,377,928 B1 * | 4/2002 | Saxena et al. | 704/275 |
| 6,457,030 B1 * | 9/2002 | Adams et al. | 715/523 |

OTHER PUBLICATIONS

WWW Consortium, "Web Content Accessibility Guidelines 1.0," (W. Chisholm et al. ed. 1999) (May 5, 1999).

* cited by examiner

Primary Examiner—Robert B. Harrell
(74) Attorney, Agent, or Firm—Wan Yee Cheung; Gary M. Hartman; Domenica N. S. Hartman

(57) ABSTRACT

A system and method of improving the accessibility of Web sites and pages through the use of accessibility descriptors that can be assigned to a Web site and/or each page of a Web site. The descriptors enable the page(s) of the site to be assessed and then displayed according to a particular user's needs, or if appropriate may notify the user if a page cannot be used or rendered more accessible. The system can be set up to require a user fee for the service, thus encouraging Web creators to design Web pages that can be modified in accordance with the accessibility descriptors.

34 Claims, 1 Drawing Sheet

SYSTEM AND METHOD FOR IMPROVING WEB SITE ACCESSIBILITY

BACKGROUND OF THE INVENTION

1. Field of the Invention

The present invention generally relates to the global Internet and Internet World Wide Web (WWW) sites. More particularly, this invention relates to a system and method for improving the accessibility of Web sites through the use of accessibility descriptors that can be assigned to a Web site and/or individual pages of a Web site to enable the page(s) of the site to be modified and displayed according to the particular user's needs.

2. Description of the Prior Art

The Internet is the world's largest network and has become essential to many businesses and important if not essential to many individuals. However, the accessibility of the Internet is limited for many people who suffer disabilities, often age-related, such as poor hearing, visual acuity and manual dexterity. These disadvantages can limit an individual's ability to use a computer in general, and the Internet in particular. As an example, about 6 percent of the population between the ages of forty-five and seventy-five cannot read newspaper print due to vision limitations, even when wearing glasses. As a result, such persons cannot read many World Wide Web (www) pages that contain newspaper-sized text in hard-to modify forms, e.g., as images rather than ASCII. In some cases, ASCII text can be made more readable by selecting a large default font as one preference of the Web browser being used. In other cases, the large font is overridden by the Web page, or the page formats very badly. It is very frustrating and discouraging, as well as useless, to load and display such a page.

With the increasing average age of the world population, age-related limitations will be an increasing problem as the Internet becomes more important in daily life. As a result, various efforts are underway to improve the accessibility of Web sites. For example, the WWW Consortium (W3C) has been very active in establishing guidelines to improve Web content accessibility for people with disabilities. However, Web site designers are not required to follow such guidelines, with the result that many Web pages have poor accessibility. There are tools available that enable a user to examine a single Web page or an entire Web site for accessibility. For example, a Web-based tool named "Bobby" created by CAST is available on the Internet for analyzing Web sites and pages based on the guidelines established by the W3C in their "Web Accessibility Initiative (WAI) Web Content Accessibility Guidelines." Bobby is used to approve Web sites that comply with the W3C guidelines, conferring a "Bobby Approved" rating that Web creators can show as an icon on their sites.

While the efforts discussed above are an important step in making the Internet more readily accessible to all persons, these efforts are largely based on persuading Web site creators to design more accessible sites, but do not actively assist the user by making an initially low-accessible site more accessible for his or her particular disabilities.

SUMMARY OF THE INVENTION

The present invention provides a system and method of improving the accessibility of Web sites and pages through the use of accessibility descriptors that can be assigned to a Web site and/or each page of a Web site to enable the page(s) of the site to be assessed, modified, and then displayed according to a particular user's needs. A set of descriptors quantifies certain aspects of a page, enabling the page to be properly presented according to a user's quantified capabilities. One example of a descriptor is the size (measured as a fraction of the screen size) of the smallest visual features on the page which must be resolved for the page to be usable. When combined with a particular user's capabilities (angular visual acuity, actual display size, and viewing distance), this information can be used to expand or modify the fonts and images to produce a readable page. The labor cost of creating the descriptors, which may be significant, can be charged either to the provider or to the users of the information, while the cost of converting the images to suit each user can be charged to the individual user, or in some instances, the conversion can be performed on the user's computer at no additional cost to the user. Thus, the system of this invention can be set up to require a user fee for the service, thus encouraging Web creators to design Web pages that can be modified in accordance with the accessibility descriptors.

In view of the above, the invention can be generally seen as an Internet service that solves the problem of Internet access for those with certain disabilities, including visual acuity, hearing impairment, manual dexterity (for mouse/keyboard control), and cognitive difficulties. Web sites may subscribe to, or be registered with, the service, depending on how the invention is implemented. The descriptors provide objective indicators of the suitability of a Web site and/or Web pages for users with regard to their physical disabilities, and in doing so can be used to determine how a Web site/page should be adapted to accommodate a particular user's disabilities. The site/page can then be appropriately modified by the user's Internet browser or a separate server to render the site/page more accessible to the user. It should be noted that this is very different from preparing and storing multiple copies of each page, with different fonts sizes, colors, etc., and then sending the appropriate page to a user. Because of the many combinations of impairments, the storage requirements of such a system would be impractical.

Alternatively, the invention may provide instructions as to how the user can suitably modify a page for viewing by adjusting their web browser's preferences. For example, such instructions might indicate what font size, face or color would be suitable given a user's visual requirements. A notice would be provided if a page cannot be suitably modified for the user, such as when the font size cannot be increased beyond a certain value without requiring excessive scrolling, or when the user's font preferences are overridden by the web page settings. The existence of alternative pages, with their URL's (Uniform Resource Locator), can also be indicated. The ratings can be indexed by the URL, which may point either to the home page of the Web site, or to individual pages within the Web site. The ratings for each page in a Web site can be stored on that page. If they are the same for all pages in a Web site, they can be stored, for example, in the site's home page. Alternatively, the ratings can be stored in a file on a special Web server in such a way that they can be quickly retrieved by making use of the URL for that page, using standard methods well known in the art.

The invention encompasses a rating system in which ratings (i.e., sets of descriptors) are provided by the operator of the service, by the creator of the Web site or page, or by an independent organization such as a nonprofit foundation for people with disabilities. The latter method decreases the chance of a conflict of interest and is believed to promote the accuracy of the ratings. The accuracy of the ratings would presumably be further promoted by charging each user of the service, rather than the Web sites, as doing so generates market pressure for accurate ratings.

From the above, it can be seen that the present invention is a significant tool for making the Internet more readily accessible to all persons by actively adapting Web sites and pages to address and accommodate the physical disabilities of users whose access to the Internet might be otherwise severely limited. Importantly, the present invention can be implemented to provide substantial motivation for Web site creators to design sites that can display normally for users without disabilities, yet adaptable to make the site more accessible to users with physical disabilities. Accordingly, this invention fulfills an immediate need, and will find even greater demand as the average age of the world population increases and the Internet becomes more important in daily life.

Other objects and advantages of this invention will be better appreciated from the following detailed description.

DETAILED DESCRIPTION OF THE PREFERRED EMBODIMENT

Figure 1:
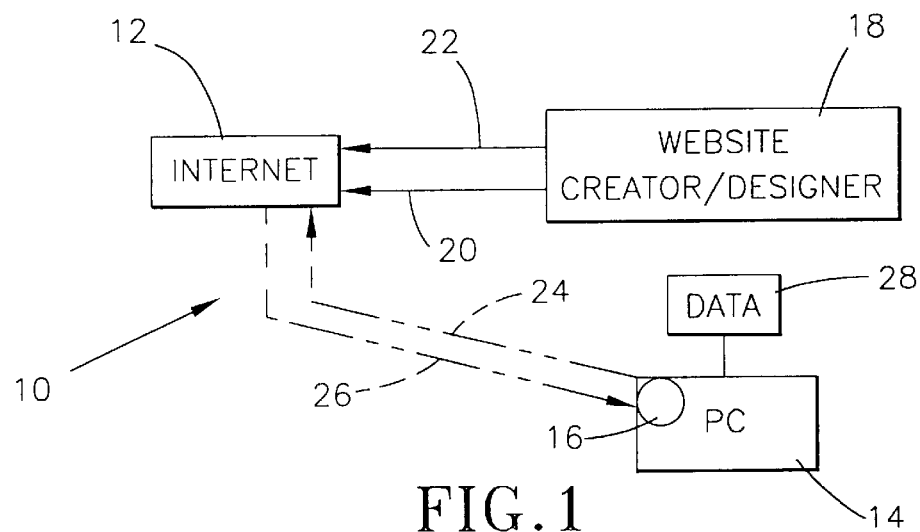
FIGS. 1, 2 and 3 schematically represent three different embodiments for implementing the accessibility rating system of the present invention.
Figure 2:
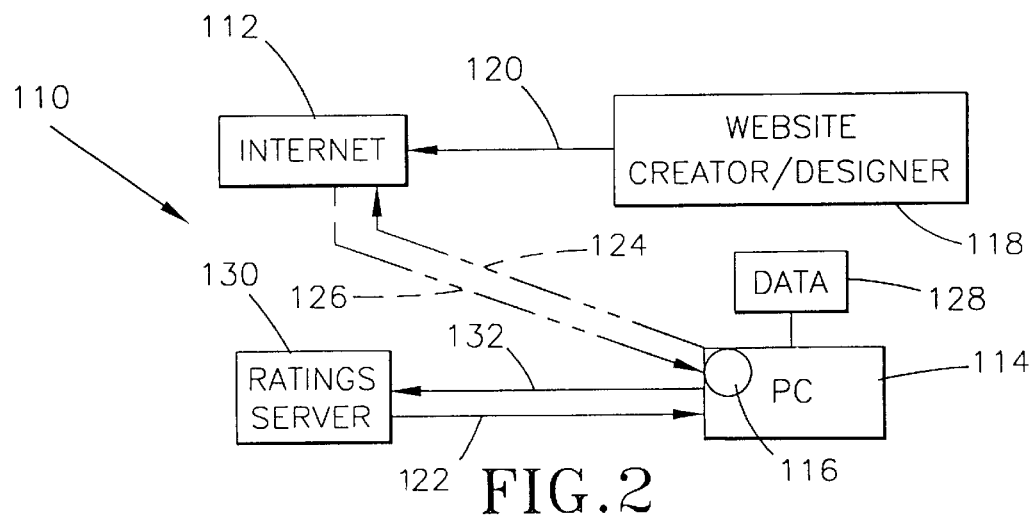
Figure 3:
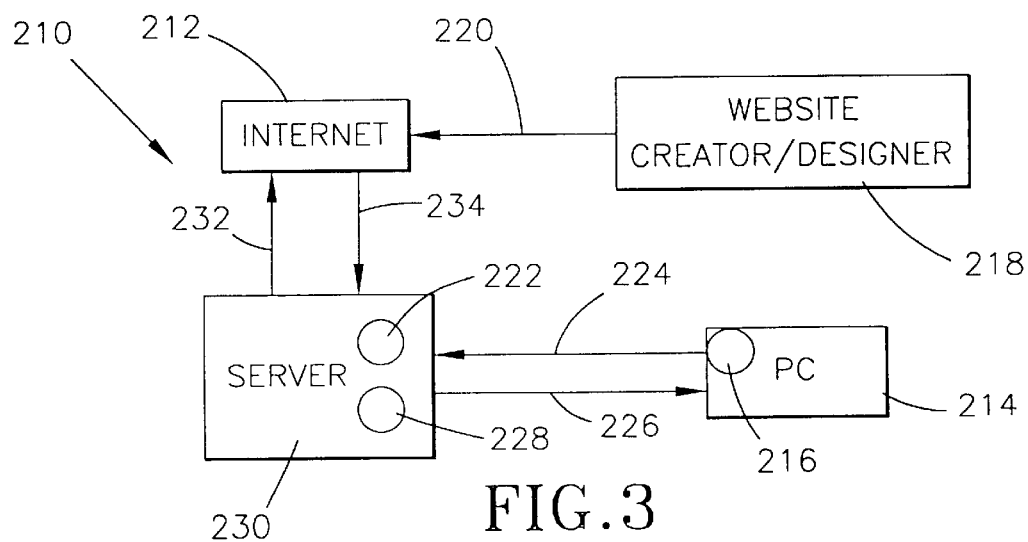

FIGS. 1 through 3 schematically represent three system environments 10, 110 and 210 by which the accessibility of a Web site and its pages can be improved through the use of accessibility descriptors in accordance with the present invention. The three environments 10, 110 and 210 differ in where the ratings are stored, in where the modifications of the pages prior to display are performed, and in how fees can be collected to pay for the costs of operating such a system. In each of the environments 10, 110 and 210, the descriptors are assigned to a Web site and/or individually to each page of a Web site to enable the page(s) of the site to be assessed and, if possible, modified to display according to a particular user's needs.

In the environment 10 of FIG. 1, a user is connected to the Internet 12 via a personal computer 14 or any other suitable means. The computer 14 is represented as having an Internet browser 16 with which a user requests and views Web sites from the Internet 12. Finally, a Web site and its pages are represented as being provided on the Internet 12 by a Web site/page designer or creator 18. The step by which the creator 18 provides the Web site for access on the Internet 12 is indicated at 20 in FIG. 1. Also represented is a step by which the creator 18 has assigned an accessibility rating 22 to the Web site or its individual pages with a rating stamp embedded within the home page or within each individual page of the Web site. The accessibility rating 22 comprises a set of accessibility descriptors for rating the Web site and/or its individual pages based on objective parameters that quantify the suitability of the Web site/page for people with a physical disability, such as reduced visual acuity, impaired hearing, reduced manual dexterity (for mouse/ keyboard control), cognitive difficulties (e.g., problems with very complex images), etc. The accessibility descriptors take into consideration various aspects of the Web page which affect accessibility, such as font size, style, color and background color, and whether these can be modified by a standard browser, in the use of audio and/or images to convey information, in the physical spacing between links and other hotspots, and so forth. The descriptors are devised to be quantified and then contrasted with the user's capabilities, which are also quantified. For example, a descriptor for images can be the size of the smallest required image detail expressed as a fraction, say "F," of the full screen dimension. A matching user capability is visual acuity, expressed as an angle "A" measured in, for example, radians. An image will be useful if the smallest feature subtends at least an angle A at the eye when viewed on a screen of dimension "S" at viewing distance "D." This requirement can be stated as:

$$F > F_{min} \quad \text{Equation 1A}$$

$$F_{min} AD/S \quad \text{Equation 1B}$$

If equations 1A and 1B are not satisfied for a given image, than It will be necessary to expand the image by at least a factor "E," the value of which is:

$$E = F_{min}/F \quad \text{Equation 2}$$

A user's screen dimension S and preferred viewing distance D are easily obtained and/or measured during setup of the environment 10, and stored in a set of data 28 on the user's computer 14. For example, the visual acuity A can be determined by having the computer display an eye chart with text or images in various sizes. The user can then be prompted to indicate, using the mouse or keyboard, which images can be recognized. Similar measurements can determine color blindness, audio limitations, minimum spacing between hotspots for effective mouse control, and some cognitive difficulties such as ability to work with cluttered screen displays.

In using the environment 10 of FIG. 1, a user uses the browser 16 to request 24 and retrieve 26 a Web page of the creator 18 from the Internet 12, at which time the suitability of the page is assessed by the user's browser 16 based on the data 28 that quantify the user's physical disabilities. By referencing the descriptors embedded in the Web site/page, each page can be assessed prior to downloading and, if possible, modified to accommodate the user's particular disabilities. In this embodiment, modification of the page can be performed by the browser 16 without any further input from the user. It will be appreciated that the browser 16 will be a special browser, or will have a special plug-in program, to be able to make use of the descriptors and preferences as described above. Alternatively, the browser 16 may be set up to report to the user how to suitably modify a page for viewing, such as what font size, face or color would be suitable given the user's visual requirements. Under some circumstances, it may be necessary for the browser 16 to indicate that a page cannot be suitably modified for the user, such as when the font size cannot be increased beyond a certain value without requiring excessive scrolling.

In the embodiment of FIG. 1, it is envisioned that the rating 22 can be optionally encoded using public key cryptography to prevent tampering or fraud, although this would seem unnecessary. The costs of creating descriptors for a group of Web pages must be considered. A Web page consists very generally of a collection of text, images and other information, plus a set of Hyper Text Markup Language (HTML) "tags," which describe how the text and images are to be displayed, where the hotspots are, and so forth. Analyzing such a page requires extensive knowledge of HTML. Some programs exist, such as Bobby, which can detect some very general accessibility problems, for example the existence of images without alternate textual labels. This is of limited value when creating descriptors which can be used to modify the page. Thus, one can anticipate large labor costs associated with creating descriptors. In the environment 10, these costs can be charged to the creator of the Web pages if they are interested in their Web site being accessible. Alternatively, the user of the descriptors can be charged a fee for their use. This can be done on a per-use basis, though keeping track of a myriad of minute transactions could be burdensome. A more practical method is to encrypt the descriptors with a time-limited key sent to authorized (i.e., paid-up) users. Charging the users has the further advantage of providing a strong market pressure to provide high-quality descriptors.

In the second embodiment of FIG. 2, the descriptors 122 for a Web page 120 are stored on a special "rating server" 130, which returns the descriptors 122 when receiving a request 124 from a user's browser 116. The descriptors 122 are thus held and owned separately from the Web page, which remains on the server 118 under control of the Web page creator. As with the environment 10 of FIG. 1, the environment 110 of FIG. 2 provides that a user is connected to the Internet 112 with a personal computer 114 that also stores data 128 which the user previously entered to quantify his or her physical disabilities. In this embodiment, the browser 116 has, in addition to the regular list of user preferences for browsing the Internet 112, a set of matching requirement descriptors for the data 128 used to describe the user's level of ability. When a page is requested 124 by the user, a simultaneous request 132 is made of the rating server 130, which returns the rating 122 to the browser 116. The browser 116 then compares the rating 122 with the user data 128 and, after the page has been retrieved 126 from the Internet 112, modifies (if feasible) the requested page before displaying the page. In view of the additional functionality required of it, the browser 116 would preferably be a special edition or include a plugin to perform the comparisons and modifications. The rating server 130 can also be configured to find and load any alternative Web pages that may be available and designed by the creator 118 (or another entity) specifically to compensate for the user's disabilities. The server 130 may notify the user of the use of the alternate page, or advise the user of its existence to allow the user to decide whether he or she wants to view the originally requested page or the alternate page. If nothing can be done to make a site/page usable, the browser 116 can provide a warning to the user and then prompt the user as to whether the site/page should be loaded anyway. With the use of a dedicated server 130 to provide the ratings for Web sites and pages, users of this service can be charged a monthly fee or a fee based on usage. An additional advantage of the embodiment of FIG. 2 is that a particular Web site can be made accessible even when the owner has little interest in doing so.

Finally, in the third embodiment of FIG. 3, all page requests 224 from the browser 216 on a user's computer 214 are routed directly through an intermediate server 230, which then relays a request 232 to the Internet 212 for a Web site or page provided 220 by a creator 218. This server 230 provides the functions assigned to the user's browsers 16 and 116 of the previous two embodiments, that is, the server 230 retrieves 234 and then, if possible, modifies the page before returning 226 the page to the user. Modification of any given page is based on the rating 222 and user data 228 stored on the server 130. More extensive value-added facilities can be provided with the environment 210 of FIG. 3, such as real-time modification of the textual content of a page to improve viewability without loss of meaning, and the selection and offering of equivalent or related Web sites which are viewable by the user. As with the embodiment of FIG. 2, users of this service can be charged a monthly fee or a fee based on usage of the server 230. Although potentially beneficial, a special browser or plugin is not required for the environment of FIG. 3.

Various modifications of the embodiments of this invention are possible, including additional features such as automatic conversion of text to voice, voice to text, increase of spacing between URL's for those with muscular control difficulties, elimination of blinking images for those with certain cognitive or neurological impairments, etc. Therefore, while the invention has been described in terms of a preferred embodiment, it is apparent that other forms could be adopted by one skilled in the art. Accordingly, the scope of the invention is to be limited only by the following claims.

What is claimed is:

1. A system for increasing the accessibility of a Web page of a Web site to an Internet user by enabling the Web page to be assessed and then displayed to compensate for a physical limitation of the Internet user, the system comprising:

means for rating the Web page for accessibility to the Internet user with the physical limitation, the rating means assigning an accessibility descriptor to the Web page;

means for accessing the Internet;

means for relaying the accessibility descriptor via the Internet to the accessing means in response to the Internet user accessing the Web page with the accessing means; and means for modifying the Web page in response to the accessibility descriptor to at least partially compensate for the physical limitation of the Internet user.

2. A system according to claim 1, wherein the relaying means is an Internet server that is accessed when the Internet user attempts to access the Web page with the accessing means, wherein the Internet server relays the accessibility descriptor to the Internet user when the Web page is accessed by the accessing means.

3. A system according to claim 2, wherein the accessing means comprises an Internet browser, the Internet browser having means for storing data regarding the physical limitation of the Internet user, the Internet browser further having means for comparing the data to the accessibility descriptor, wherein the modifying means modifies the Web page in response to the comparison by the Internet browser of the data and the accessibility descriptor.

4. A system according to claim 2, wherein the Internet server comprises:

means for storing data regarding the physical limitation of the Internet user;

means for comparing the data to the accessibility descriptor; and the modifying means, such that the Internet server modifies the Web page in response to the comparison of the data and the accessibility descriptor and then delivers the modified Web page to the Internet browser.

5. A system according to claim 1, further comprising means for notifying the Internet user if the Web page cannot be modified with the modifying means to compensate for the physical limitation of the Internet user.

6. A system according to claim 1, further comprising means for notifying the Internet user as to how the Internet user can modify the Web page with the accessing means to compensate for the physical limitation of the Internet user.

7. A system according to claim 1, further comprising means for notifying the Internet user of another Web page that is already formatted to compensate for the physical limitation of the Internet user.

8. A system according to claim 1, wherein the modifying means comprises means for increasing the font size, face and color of text on the Web page.

9. A system according to claim 1, wherein the modifying means comprises means for increasing spacing between items on the Web page.

10. A system according to claim 1, wherein the modifying means comprises means for automatically converting between text and audio signals and images provided by the Web page.

11. A system according to claim 1, wherein the modifying means comprises means for eliminating visual images on the Web page.

12. A system according to claim 1, wherein the rating means is configured to enable a provider of the Web page to assign the accessibility descriptor for the Web page.

13. A system according to claim 1, wherein the accessibility descriptor is embedded in the Web page.

14. A system according to claim 1, wherein the rating means is configured to enable an entity other than the Internet user and a provider of the Web page to assign the accessibility descriptor for the Web page.

15. A system according to claim 1, wherein the physical limitation of the Internet user is at least one disability associated with visual acuity, hearing impairment, manual dexterity or cognitive capacity.

16. A system according to claim 1, further comprising means for charging a user fee for the Internet user's use of the system.

17. A method for increasing the accessibility of a Web page of a Web site to an Internet user by enabling the Web page to be assessed and then displayed to compensate for a physical limitation of the Internet user, the method comprising the steps of:

rating the Web page for accessibility to the Internet user with the physical limitation by assigning an accessibility descriptor to the Web page;

accessing the Internet with an accessing means;

relaying the accessibility descriptor via the Internet to the accessing means in response to the Internet user accessing the Web page with the accessing means; and modifying the Web page in response to the accessibility descriptor to at least partially compensate for the physical limitation of the Internet user.

18. A method according to claim 17, wherein the relaying step is performed by an Internet server that is accessed during the accessing step, and the Internet server relays the accessibility descriptor to the Internet user when the Web page is accessed by the accessing means.

19. A method according to claim 18, wherein the accessing step is performed with an Internet browser with which data is stored regarding the physical limitation of the Internet user, the Internet browser further performing the step of comparing the data to the accessibility descriptor, wherein the modifying step is performed in response to the comparing step.

20. A method according to claim 18, wherein the accessing step is performed with an Internet server on which is stored data regarding the physical limitation of the Internet user, the Internet server further performing the step of comparing the data to the accessibility descriptor and then performing the modifying step in response to the comparing step.

21. A method according to claim 17, further comprising the step of notifying the Internet user if the Web page cannot be modified to compensate for the physical limitation of the Internet user.

22. A method according to claim 17, further comprising the step of notifying the Internet user as to how the Internet user can modify the Web page to compensate for the physical limitation of the Internet user.

23. A method according to claim 17, further comprising the step of notifying the Internet user of another Web page that is already formatted to compensate for the physical limitation of the Internet user.

24. A method according to claim 17, wherein the modifying step comprises increasing the font size, face and color of text on the Web page.

25. A method according to claim 17, wherein the modifying step comprises increasing spacing between items on the Web page.

26. A method according to claim 17, wherein the modifying step comprises automatically converting between text and audio signals and images provided by the Web page.

27. A method according to claim 17, wherein the modifying step comprises eliminating visual images on the Web page.

28. A method according to claim 17, wherein the rating step is performed by a provider of the Web page.

29. A method according to claim 17, further comprising the step of embedding the accessibility descriptor in the Web page.

30. A method according to claim 17, wherein the rating step is performed by an entity other than the Internet user and a provider of the Web page.

31. A method according to claim 17, wherein the physical limitation of the Internet user is at least one disability associated with visual acuity, hearing impairment, manual dexterity or cognitive capacity.

32. A method according to claim 17, further comprising the step of charging a user fee to the Internet user.

33. A system for increasing the accessibility of a Web page of a Web site to an Internet user by enabling the Web page to be assessed and then modified prior to being displayed to compensate for a physical limitation of the Internet user, the system comprising:

computer means with an Internet browser for accessing the Internet means for storing data regarding the physical limitation of the Internet user;

server means on which are stored accessibility descriptors, at least one of the accessibility descriptors pertaining to a characteristic of the Web page that makes access by the Internet user difficult as a result of the physical limitation of the Internet user;

means for comparing the data of the Internet browser to the accessibility descriptors of the server means; and means for modifying and then transmitting the Web page to the Internet browser of the Internet user, the modifying and transmitting means being operable to modify the Web page in response to the comparing means to at least partially compensate for the physical limitation of the Internet user.

34. A method for increasing the accessibility of a Web page of a Web site to an Internet user by enabling the Web page to be assessed and then modified prior to being displayed to compensate for a physical limitation of the Internet user, the method comprising the steps of:

providing computer means with an Internet browser for accessing the Internet;

assembling data regarding the physical limitation of the Internet user;

providing server means on which are stored accessibility descriptors, at least one of the accessibility descriptors pertaining to a characteristic of the Web page that makes access by the Internet user difficult as a result of the physical limitation of the Internet user;

comparing the data to the accessibility descriptors of the server means; and modifying and then transmitting the Web page to the Internet browser of the Internet user, by which the Web page is modified in response to comparing the data to the accessibility descriptors to at least partially compensate for the physical limitation of the Internet user.

* * * * *